United States Patent [19]

Matsuda et al.

[11] 4,417,559

[45] Nov. 29, 1983

[54] SUPERCHARGER APPARATUS FOR INTERNAL COMBUSTION ENGINE

[75] Inventors: Minoru Matsuda, Chofu; Kentaro Kato, Niiza; Masatoshi Suzuki, Urawa, all of Japan

[73] Assignee: Honda Giken Kogyo Kabushiki Kaisha, Tokyo, Japan

[21] Appl. No.: 269,984

[22] Filed: Jun. 3, 1981

[30] Foreign Application Priority Data

Jun. 25, 1980 [JP] Japan ............................ 55-85163

[51] Int. Cl.³ ............................................ F02D 23/00
[52] U.S. Cl. .................................... 123/559; 123/52 M
[58] Field of Search ............ 123/559, 563, 445, 52 M; 60/597, 598, 599, 605; 248/659, 609; 285/49

[56] References Cited

U.S. PATENT DOCUMENTS

| | | | |
|---|---|---|---|
| 2,579,643 | 12/1951 | Baak ................................. | 60/599 X |
| 2,791,205 | 5/1957 | Platner et al. ..................... | 123/52 M |
| 3,015,322 | 1/1962 | Rohm ................................ | 123/52 M |
| 3,875,918 | 4/1975 | Loynd ............................... | 123/52 M |
| 3,936,078 | 2/1976 | Wallyn .............................. | 285/49 |
| 4,059,293 | 11/1977 | Sipler ................................ | 285/236 |
| 4,254,746 | 3/1981 | Chiba et al. ....................... | 123/52 M |

*Primary Examiner*—Michael Koczo
*Assistant Examiner*—Peggy A. Loiacano
*Attorney, Agent, or Firm*—Armstrong, Nikaido, Marmelstein & Kubovcik

[57] ABSTRACT

A supercharger apparatus for an internal combustion engine having an intake passage member coupled to the internal combustion engine. The intake passage member comprises a compressor, a pre-chamber on the downstream side of the compressor, a throttle valve on the downstream side of the pre-chamber, and a heat insulating elastic member interposed between the compressor and the pre-chamber and between the pre-chamber and an intake port of the engine. The portion of the intake passage that has the pre-chamber and the valve is supported in a floating condition by said elastic member on both ends thereof.

4 Claims, 2 Drawing Figures

SUPERCHARGER APPARATUS FOR INTERNAL COMBUSTION ENGINE

BACKGROUND OF THE INVENTION

1. Field of the Invention

This invention relates to a supercharger apparatus for an internal combustion engine in a motorized two-wheeled vehicle such as a motorcycle or the like, and more particularly to an apparatus which includes a pre-chamber and valve which are elasticly coupled to other engine components.

2. Description of the Prior Art

As to an apparatus of this kind, there has been hitherto known an intake passage of an internal combustion engine which is provided with a compressor, a pre-chamber on a downstream side of the compressor and a throttle valve on a downstream side of the pre-chamber. The pre-chamber is fixed directly to a frame such as of a vehicle body or the like. This type of apparatus, however, is inconvenient in that the pre-chamber does not move with the vibration of the engine but moves with the vibration of the vehicle body, and because of the difference in movement between the vehicle body and the engine, the connecting portion between the pre-chamber and a tube portion of the intake passage is subjected to a large external force and is liable to be damaged.

SUMMARY OF THE INVENTION

It is the primary object of the present invention to provide apparatus in which the pre-chamber and other associated elements are coupled to fixed engine components such that they can vibrate or float without being subjected to large external forces.

The present invention is directed to an apparatus of the type wherein an intake passage of an internal combustion engine is provided with a compressor, a pre-chamber on a downstream side of the compressor and a throttle valve on a downstream side of the pre-chamber. It is characterized in that respective heat insulating elastic bodies are interposed between the compressor and the prechamber and between the pre-chamber and an intake port of the engine, so that such a portion of the intake passage that has the pre-chamber and the valve is supported in a floating condition by the elastic bodies on both ends thereof.

DETAILED DESCRIPTION OF THE PREFERRED EMBODIMENT

Figure 1:
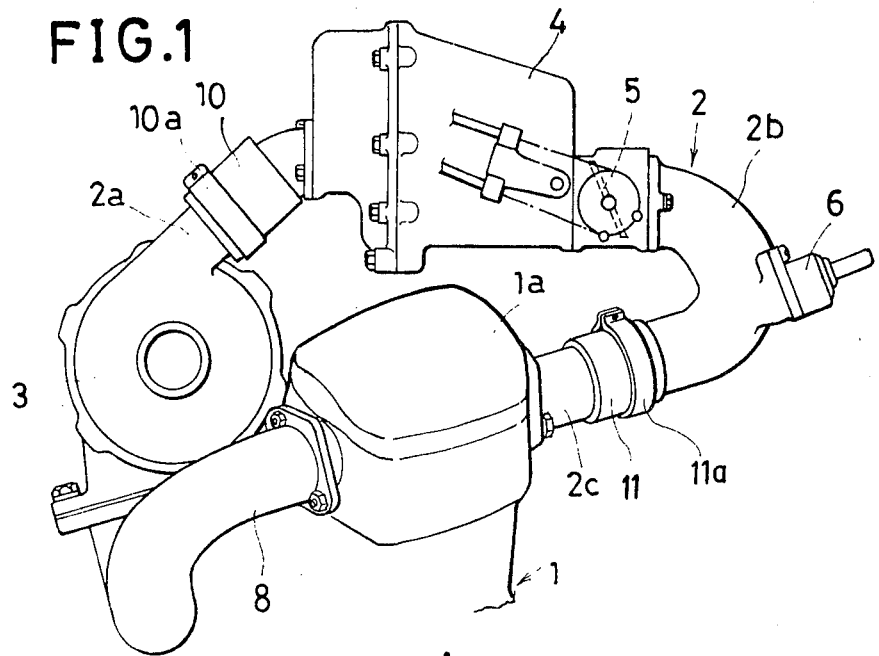
FIG. 1 is a side view of the preferred embodiment of the present invention.
Figure 2:
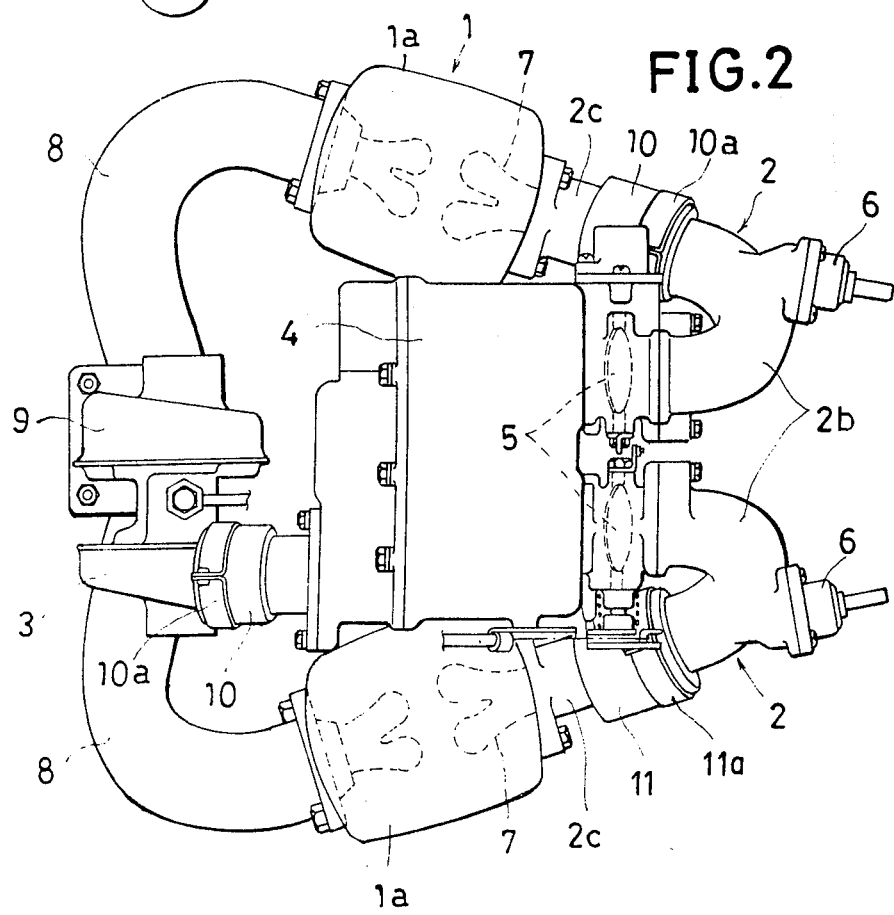
FIG. 2 is a top plan view thereof.

Referring to the drawings, an internal combustion engine 1 of a two-cylinder type, has an intake passage assembly 2 extending from each cylinder 1a thereof. The intake passage assembly 2 is provided with a compressor 3, a pre-chamber 4 on a downstream side of the compressor 3, a throttle valve 5 on a downstream side of the pre-chamber 4 and a fuel injection nozzle 6 on a downstream side of the throttle valve 5. The intake passage assembly 2 is connected at its downstream end portion to an intake port 7 of the cylinder 1a of the engine 1. The engine 1 thus includes a supercharger. An exhaust passage 8 extends from each cylinder 1a and an exhaust turbine 9 is provided in the passage 8. The compressor 3 is driven by the turbine 9.

Heat insulating elastic bodies 10 and 11 are interposed in the intake passage assembly 2 between the compressor 3 and the pre-chamber 4 and between the throttle valve 5 and the intake port 7, respectively. The portion of the intake passage assembly 2 that has the pre-chamber 4 and the throttle valve 5 is supported in a floating condition by the elastic bodies 10 and 11 on both ends thereof.

In other words, the intake passage assembly 2 comprises three divided portions, that is, an upstream portion 2a having the compressor 3, an intermediate portion 2b having the pre-chamber 4, the throttle valve 5 and the fuel injection nozzle 6, and a downstream portion 2c connected to the intake port 7. The intermediate portion 2b is connected to the upstream portion 2a and the downstream portion 2c through the respective elastic bodies 10 and 11 on the outer ends of the intermediate portion 2b whereby the intermediate portion 2b is supported in a floating condition by the two elastic bodies 10 and 11.

Each of the elastic bodies 10 and 11 is composed of a tubular rubber member, and is used in such a manner that the same is mounted at the respective end portions on the upstream side and downstream side tube bodies and is fixed thereto by means of fastening bands 10a and 11a, respectively.

Thus, according to the present invention, the intermediate portion of the intake passage assembly, having the prechamber and the throttle valve, is connected to the upstream portion and the downstream portion of the intake passage assembly through the respective elastic bodies so as to be supported in a floating condition by the elastic bodies. Thus, when the engine is vibrated, the intermediate portion moves therewith within a somewhat delayed manner and thus the respective elastic bodies are not acted on by a large force. Consequently, the apparatus has an increased durability and can be more easily assembled.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A supercharger apparatus for an internal combustion engine for a vehicle having an intake passage means coupled to said internal combustion engine, said intake passage means comprising a compressor, a pre-chamber on the downstream side of said compressor, two throttle valves on the downstream side of said pre-chamber, a first heat insulating elastic means coupled between said compressor and said pre-chamber and two second heat insulating elastic means coupled between each of said throttle valves and a corresponding intake port of said engine, wherein said throttle valves are disposed closer to said second elastic means than said first elastic means, and wherein the portion of the intake passage that has said pre-chamber and each of said throttle valves is supported in a floating condition by said first and second elastic means on both ends thereof.

2. A supercharger apparatus as set forth in claim 1 wherein said intake passage means includes a first end portion, including said compressor, having one end thereof coupled to said engine and the other end thereof coupled to one of said first elastic means; and intermediate portion including said pre-chamber and said at least one throttle valve, coupled between said first and second elastic means; and a second end portion having one end thereof coupled to said at least one second elastic means and the other end thereof coupled to said engine.

3. A supercharger apparatus as set forth in claim 1 including at least one fuel injection nozzle positioned between said at least one throttle valve and said at least one second elastic means.

4. A supercharger as set forth in claim 1 wherein said at least one fuel injection nozzle comprises two fuel injection nozzles, each positioned between one of said throttle valves and one of said second elastic means.

* * * * *